United States Patent [19]

Busey et al.

[11] Patent Number: 5,764,916

[45] Date of Patent: Jun. 9, 1998

[54] METHOD AND APPARATUS FOR REAL TIME COMMUNICATION OVER A COMPUTER NETWORK

[75] Inventors: Andrew T. Busey; Gerald H. Weghorst, Jr., both of Austin, Tex.

[73] Assignee: ichat, Inc., Austin, Tex.

[21] Appl. No.: 722,898

[22] Filed: Sep. 27, 1996

[51] Int. Cl.⁶ .................................................. G06F 17/30
[52] U.S. Cl. .......................... 395/200.57; 395/200.33; 395/200.34; 395/200.36; 395/200.48; 395/762; 395/774
[58] Field of Search ..................... 395/200.57, 200.33, 395/200.34, 200.36, 200.48, 774, 762; 370/289; 379/93.14

[56] References Cited

U.S. PATENT DOCUMENTS

| | | | |
|---|---|---|---|
| 4,914,586 | 4/1990 | Swinehart et al. | 707/101 |
| 5,159,669 | 10/1992 | Trigg et al. | 395/189 |
| 5,220,657 | 6/1993 | Bly et al. | 395/425 |
| 5,276,679 | 1/1994 | McKay et al. | 370/358 |
| 5,287,103 | 2/1994 | Kasprzyk et al. | 340/825.52 |
| 5,297,249 | 3/1994 | Bernstein et al. | 345/356 |
| 5,481,666 | 1/1996 | Nguyen et al. | 347/357 |
| 5,506,984 | 4/1996 | Miller | 707/10 |
| 5,528,671 | 6/1996 | Ryu et al. | 379/93.14 |
| 5,530,852 | 6/1996 | Meske, Jr. et al. | 395/600 |
| 5,537,546 | 7/1996 | Sauter | 395/200.6 |
| 5,539,886 | 7/1996 | Aldred et al. | 395/684 |
| 5,572,643 | 11/1996 | Judson | 395/200.48 |
| 5,617,565 | 4/1997 | Augenbraun et al. | 707/4 |
| 5,619,650 | 4/1997 | Bach et al. | 395/200.76 |
| 5,659,729 | 8/1997 | Nielsen | 395/603 |
| 5,671,428 | 9/1997 | Muranaga et al. | 395/772 |

OTHER PUBLICATIONS

Computer Technology Review, 16 (3):1, "They're Not Just For Browsing Anymor", Kim Borg, Mar. 6, 1996.

*Primary Examiner*—Christopher B. Shin
*Attorney, Agent, or Firm*—Brobeck, Phleger & Harrison LLP

[57] ABSTRACT

In a method for real time network chat, TCP/IP connections are established between a plurality of clients and a host. Respective real time communications protocol connections such as telnet or IRC are established over the TCP/IP connections, and a message is sent from one of the clients to at least one of the other clients through the host using the respective real time communications protocol connections therebetween. The message, which includes one or more instructions in a markup language such as html, for example, is parsed in the receiving chat client, which displays the message in accordance with the markup language instructions contained therein. Where the markup language instruction is a hyperlink, the telnet chat client receiving the message from the host communicates the URL associated with the hyperlink to a Web browser under user control, and the Web browser requests and receives the desired Web document.

5 Claims, 3 Drawing Sheets

METHOD AND APPARATUS FOR REAL TIME COMMUNICATION OVER A COMPUTER NETWORK

BACKGROUND OF THE INVENTION

1. Field of the Invention

The present invention relates to network communications, and more particularly to real-time network chat.

2. Description of Related Art

The location and exchange of data over computer networks is controlled by various network protocol. For example, the World Wide Web (hereinafter "Web") is a system of communications protocols that presents information in documents that are capable of being linked to other documents. The documents are stored in a distributed manner across the Internet on the networked computers, and are accessed using programs known as browsers.

The Web is a system of protocols exchanged between a host computer running an application, known as a server, that delivers Web documents, and a user's computer, known as the client. The most fundamental of Internet protocols is Transmission Control Protocol/Internet Protocol, or TCP/IP, which in effect provides a description of the document data being exchanged and a destination for that data.

Web documents are created using a markup language known as html, or Hypertext Markup Language. Generally, a markup language is a set of instructions, or markups, that is used to direct a browser how to display and manage a document. Specifically, html defines the format of a Web document and enables hyperlinks to be embedded in the Web document. Hyperlinks are used to connect a document on one host computer to a document on another host computer. The following html paragraph is illustrative.

<P>

Welcome to the home page of <B>ichat, Inc.</B>. We develop <A HREF='../products/index.html'>software</A>that expands the functionality and accessibility of real-time Internet chat systems.

The html tags "<B> . . . </B>" instructs the browser to display ichat Inc. in bold font. The html tag "<A HREF=" instructs the browser to create a link to a web page referenced by the embedded Uniform Resource Locator ("URL"), which is a type of address, and to use the word "software" embedded between the tags "> . . . </A>" as the hyperlinked word. The link may be a target, which is a word or phrase in another section of the same Web page; a relative link, which is another Web page within the current site, either forward or backward relative to the current page; or an external or absolute link, which is a Web page on another host.

A Web browser or client requests a Web document in accordance with its URL, which typically is furnished either manually by the user, through a Web browser bookmark, or through a hyperlink embedded in an html document. The Web browser causes a two-way TCP/IP connection to be established between the client and the host from which the desired Web document is available, and then generates and sends to the host a request header to establish an HTTP connection. The server on the host responds to the URL either by (i) following the directory path contained in the URL and opening the file containing the requested document; or (ii) running a CGI, or Common Gateway Interface, script; or (iii) detecting an error and generating an error document. The host then returns the document along with its file type to the client. After the client acknowledges receipt of the Web document, the host closes the HTTP connection even though the TCP/IP connection may be maintained by the service provider.

The term "HTTP" used above stands for Hypertext Transfer Protocol, which is a transfer protocol that sits on top of TCP/IP and is a stateless protocol designed to transfer documents at a high rate of speed. As a stateless system, HTTP does not retain any information from one document transfer to the next. If additional documents are needed, each II additional document must be transferred by opening a new HTTP connection, requesting the document, delivering the document, and closing the connection.

After the requested Web document is received and the HTTP connection closed, the browser interprets the page format from the imbedded html tags in a process known as parsing. Typically, the html tags format text, load images, and embeds hyperlinks. When the browser encounters an html tag that links to a different type of MIME file such as a sound clip or picture, the browser separately requests that sound clip or picture in another HTTP connection. Hence, if the Web page contains both a sound clip and an image, three requests are made—one for the original html page, one for the sound clip file, and one for the image file.

Although generally successful for many Web functions, the HTTP protocol is ineffective for enabling real-time functions such as chat over networks such as the Internet. However, chat is available over the Internet using the Internet Relay Chat protocol, or IRC. IRC uses the TCP/IP protocol in a client/server model. IRC client software is installed on the user side and integrated into the Web browser. One client initiates a channel by connecting to an IRC enabled server, which may or may not be on the same host as the Web server. Other clients join the channel by typing a join IRC command. The IRC server mediates the channel, passing each message to all channel members or to particular channel members, as determined by the originator of the message.

While IRC has had some success, its widespread use is hampered by several inconvenient aspects of the protocol. For example, IRC is cumbersome and does not support features common in Web browsers, such as hyperlinks and graphics.

SUMMARY OF THE INVENTION

The present invention advantageously permits real-time chat to be maintained over computer networks such as the Internet with enhanced functionality of the type generally available to World Wide Web users using Web browsers.

In a method for real time network chat, a real time communications protocol connection is formed over a network communications connection. A hyperlink instruction or any instruction selected from an html instruction set is embedded in a message. The message is sent on the real time communications protocol connection.

In another embodiment of the method, a real time communications protocol connection is formed over a network communications connection. A first message is received on the real time communications protocol connection, the first message containing a hyperlink instruction or an instruction selected from an html instruction set. The first message is parsed to identify the instruction contained therein, and the first message is displayed in accordance with the instruction contained therein.

In other embodiments, the invention includes means for performing the various method steps.

BRIEF DESCRIPTION OF THE DRAWINGS

In the drawings, in which like reference characters indicate like parts.

DETAILED DESCRIPTION OF THE PREFERRED EMBODIMENT

Figure 1:
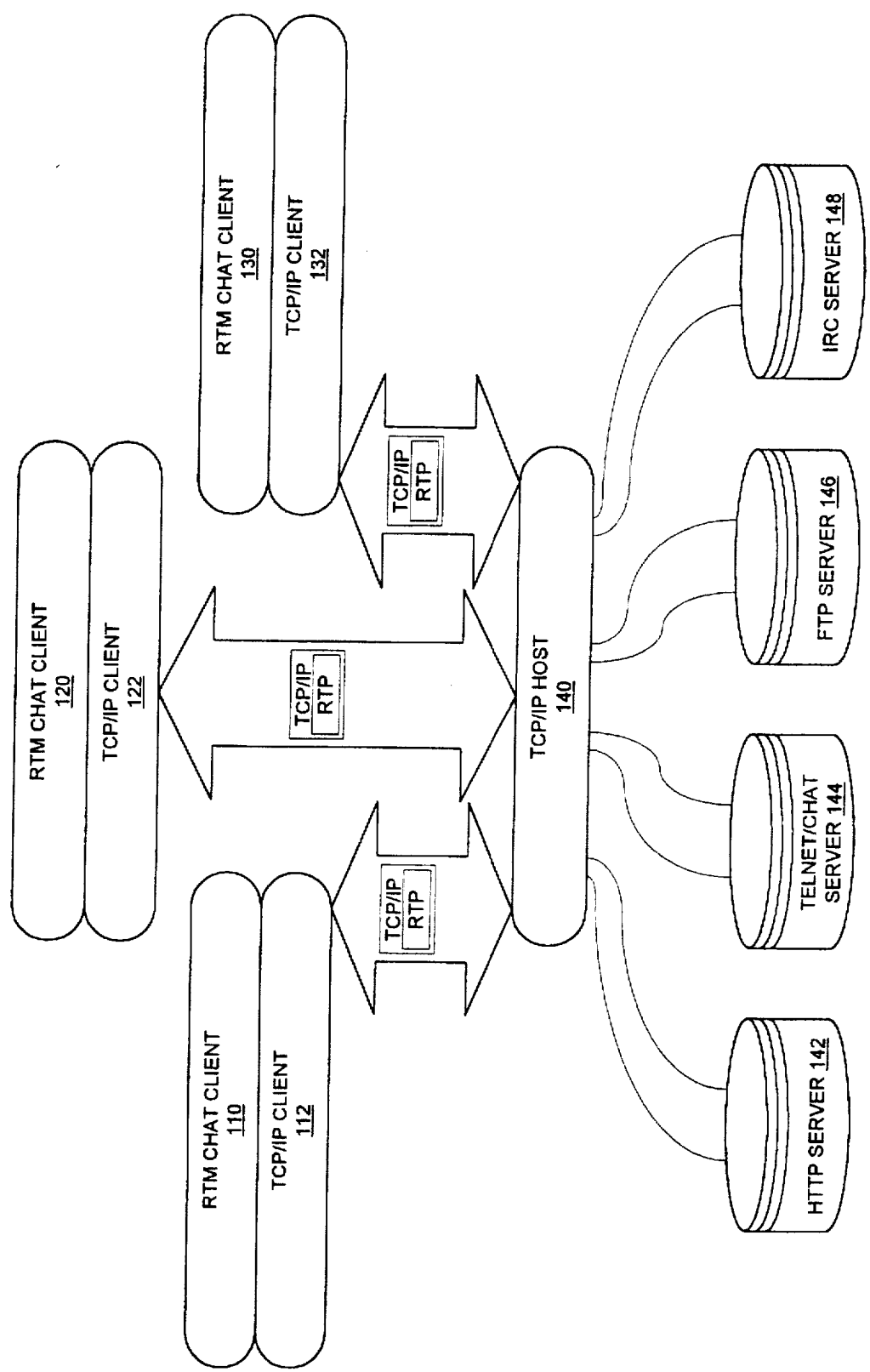
FIG. 1 is a schematic diagram of network protocol connections between clients and a host in accordance with the present invention.
Figure 2:
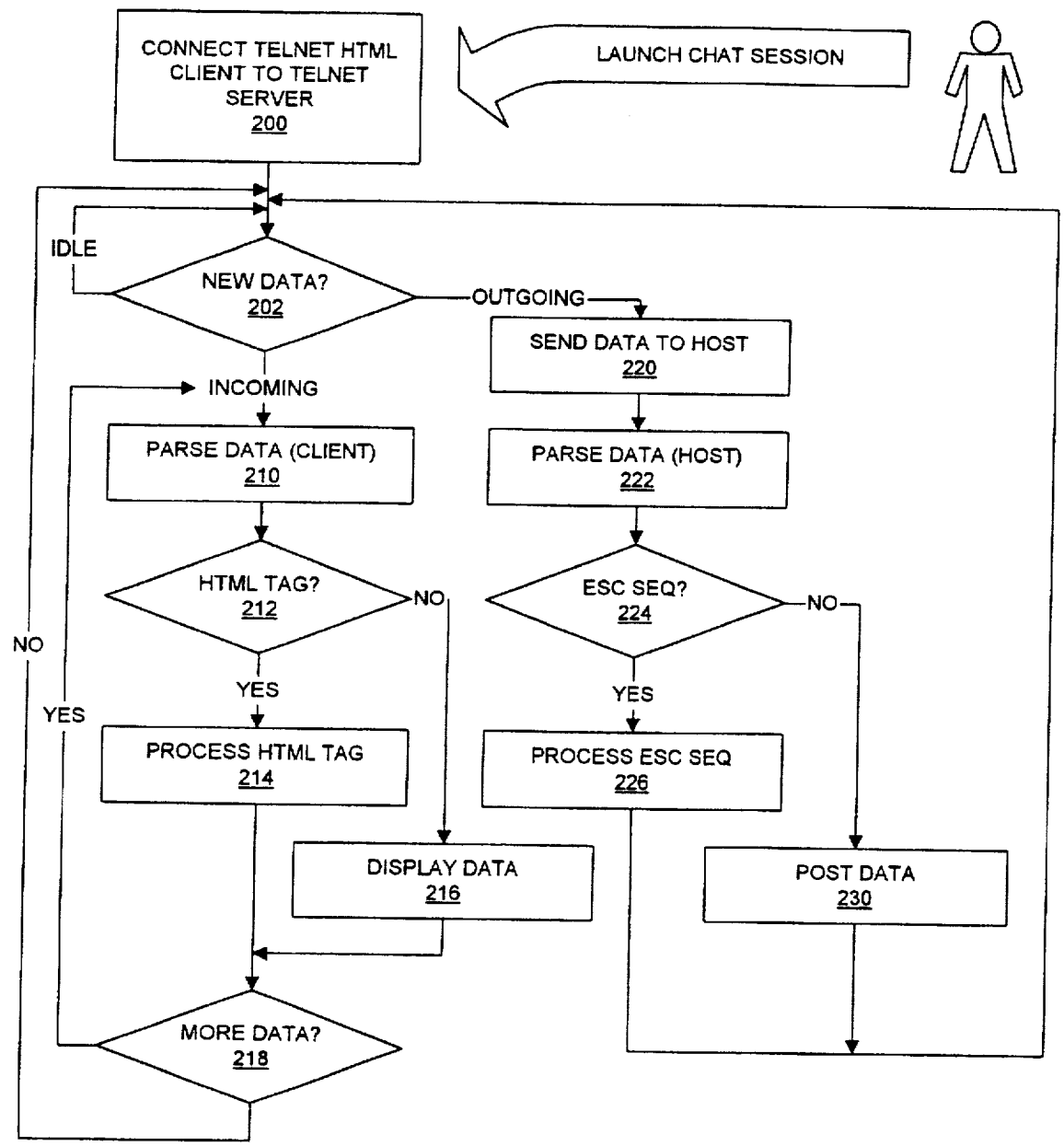
FIG. 2 is a flow chart of a method for real time network chat in accordance with the present invention.

FIG. 1 and FIG. 2 show a process for real-time conferencing across the Internet. The process begins with a user who launches a chat session from his or her computer, preferably from a browser application running on the computer, by running an application called a real time markup ("RTM") chat client. The computer operating system ("OS") causes a two-way TCP/IP connection to be established between the client computer and a host computer for the chat session, while the RTM chat client causes a real time full duplex connection to be established between the RTM chat client and a real time server on the host. Other users join the chat session by establishing TCP/IP connections and launching their own RTM chat clients. FIG. 1 shows three RTM chat clients 110, 120 and 130, which run on top of respective TCP/IP clients 112, 122 and 132. The TCP/IP connections are established with a host computer, which runs TCP/IP host software 140 and typically hosts several different types of servers. FIG. 1 illustratively shows four servers, an HTTP server 142, a telnet/chat server 144, an FTP server 146, and an Internet Relay Chat ("IRC") server 148.

Typically, a variety of other server types reside on the host computer as well, including, for example, Gopher, Usenet and WAIS.

A real time chat client is any client capable of sustaining what appears to a user to be real time chat. The effect of real time is created by using a continuously open connection protocol such as, for example, a continuously open streaming protocol such as telnet or a continuously open connection packet protocol such as IRC. Telnet is a well known streaming protocol used to establish bi-directional continuously opened sockets and full duplex data transmission to achieve real time communications. The telnet protocol is an industry standard. UNIX hosts are generally provided with telnet servers as part of their operating systems. Other examples of continuously opened connection streaming protocols include UDP, or Universal Data Protocol, and a variety of proprietary protocols. IRC is a well known packet protocol used to establish bi-directional continuously opened sockets and full duplex data transmission to achieve real time communications. The IRC protocol is an industry standard, fully defined in RFC 1459. In contrast, the HTTP protocol defines a transactional half-duplex data transmission. HTTP connections are opened and closed as documents are requested and sent. Real time communication is not realized.

A markup language is any language that enables document formats to be defined, and may also enable hyperlinks to be embedded in documents. The most popular markup language in use on the Web is html, which supports embedded hyperlinks, various font styles such as bold and italics, and various MIME (Multipurpose Internet Mail Extension) file types for text and embedded graphics, video and audio.

FIG. 2 shows what happens when a RTM chat client is launched. Illustratively, the chat client in FIG. 2 is a telnet html chat client and the host includes a telnet server and a server-side application known as a chat server that enables communication between two or more chat clients. While FIG. 2 shows use of the telnet protocol and a compatible chat server, the IRC protocol and an IRC chat server may be used if desired, as well as any other continuously open bi-directional connection chat client-server types and compatible chat server applications. Chat servers are well known; for example, the telnet protocol and proprietary chat server software is commonly used by commercial BBS services, and the IRC protocol and IRC server side chat applications are common in many UNIX environments. While FIG. 2 also shows use of html, other markup languages may be used if desired.

After the TCP/IP and telnet connections are made (step 200), the telnet html chat client immediately begins to receive any messages being posted by the chat server, and may send messages to other telnet html chat clients through the chat server or remain idle in the event that no messages are being sent or received. While non-html telnet clients may also be connected to the chat server, they will not be capable of displaying the incoming data with fidelity because they will not be able to properly parse it.

Messages outgoing from the telnet chat client are processed as follows. The telnet chat client is designed either to send each keystroke to the host either individually or in groups. In either case, the telnet chat client appends the keystroke(s) to a TCP/IP header and the resulting packet is sent to the chat host (step 220). The chat host parses the incoming data in real time (step 222). If the chat host detects a telnet escape sequence (step 224), it processes the detected escape sequence (step 226). Otherwise, the chat host simply posts the data (step 230) to all connected telnet clients or to a specific or ones of connected telnet clients if so instructed by the chat server. The telnet host does not recognize or process html tags in the data, and simply posts them. Connected telnet clients that are not html enabled simply display the html tags as they are received. However, connected telnet html clients recognize and respond to the html tags in the data.

Messages outgoing from an IRC chat client are processed in a slightly different manner. An IRC packet is the entire series of keystrokes preceding a carriage return. An IRC chat client appends the IRC packet or in some cases breaks up the IRC packet into subpackets and appends each sub-packet to a TCP/IP header, and the resulting TCP/IP packet is sent to the IRC chat host. The IRC chat host parses the incoming data in real time, processing any IRC headers and handling the appended data accordingly.

The telnet chat client processes incoming messages containing html tags as follows. The telnet chat client parses the incoming data (step 210) to distinguish between html tags and characters to be displayed. If an html tag is detected (step 212), the tag is processed as appropriate (step 214). If an html tag is not detected (step 212), the incoming data is displayed on the chat screen of the telnet chat client computer (step 216). In either case, the telnet chat client then looks for more data to process (step 218), and either resumes parsing or idles if no incoming or outgoing message is present.

The telnet connection is terminated either by the client or the host. Termination is done by releasing the socket for the connection, in a manner well known in the art.

An example of a real time chat session among chat clients using html is as follows.

<Sarah>Hi everyone! I found a great web site. Check out the ichat site.

<Sam>Thanks for the info, Sara. I'm going to check out the site now. Bye.

This text appears on the screens of the html chat clients who are members of the chat session.

When Sarah types her message, she uses either macros or html itself to cause the word "great" to appear in an italics font style, the phrase "Check out" to appear in a bold font style, and to create the hyperlink ichat site. Sarah's chat client software sends the following illustrative data stream to members of the chat session via the host.

Hi everyone! I found a <I>great</I>web site. <B>Check out</B>the <A HREF='http://www.ichat.com'>ichat site.</A>

The html chat client software displays Sara's message as it is typed in a normal font, until the "<I>" tag is detected. The characters "great" are displayed as they are typed in an italics style font until the "</I>" tag is detected, after which subsequent characters are again displayed at they are typed in a normal font. When the "<B>" tag is detected, the subsequent characters "great" are displayed as they are typed in a bold font until the "</B>" tag is detected, after which subsequent characters are again displayed at they are typed in a normal font. When the tag "<A HREF=" http://www.ichat.com'>' is detected, Sam's software responds by linking the URL'http://www.ichat.com' to the text following the tag, until the tag "</A>" is detected. Hence, the URL'http://www.ichat.com' is linked to the hyperlink ichat site. This hyperlink is displayed as its characters are typed in a underlined and colored font until the "</A>" tag is detected, after which any subsequent characters are displayed at they are typed in a normal font.

Sam responds to Sara's message with his message, and then simply clicks on the hyperlink "ichat site" in his chat window using either his mouse or keyboard navigation. This action launches Sam's Web browser, if it is not already running. Sam's Web browser takes him to the ichat home page, without need for Sam to enter a URL.

Figure 3:
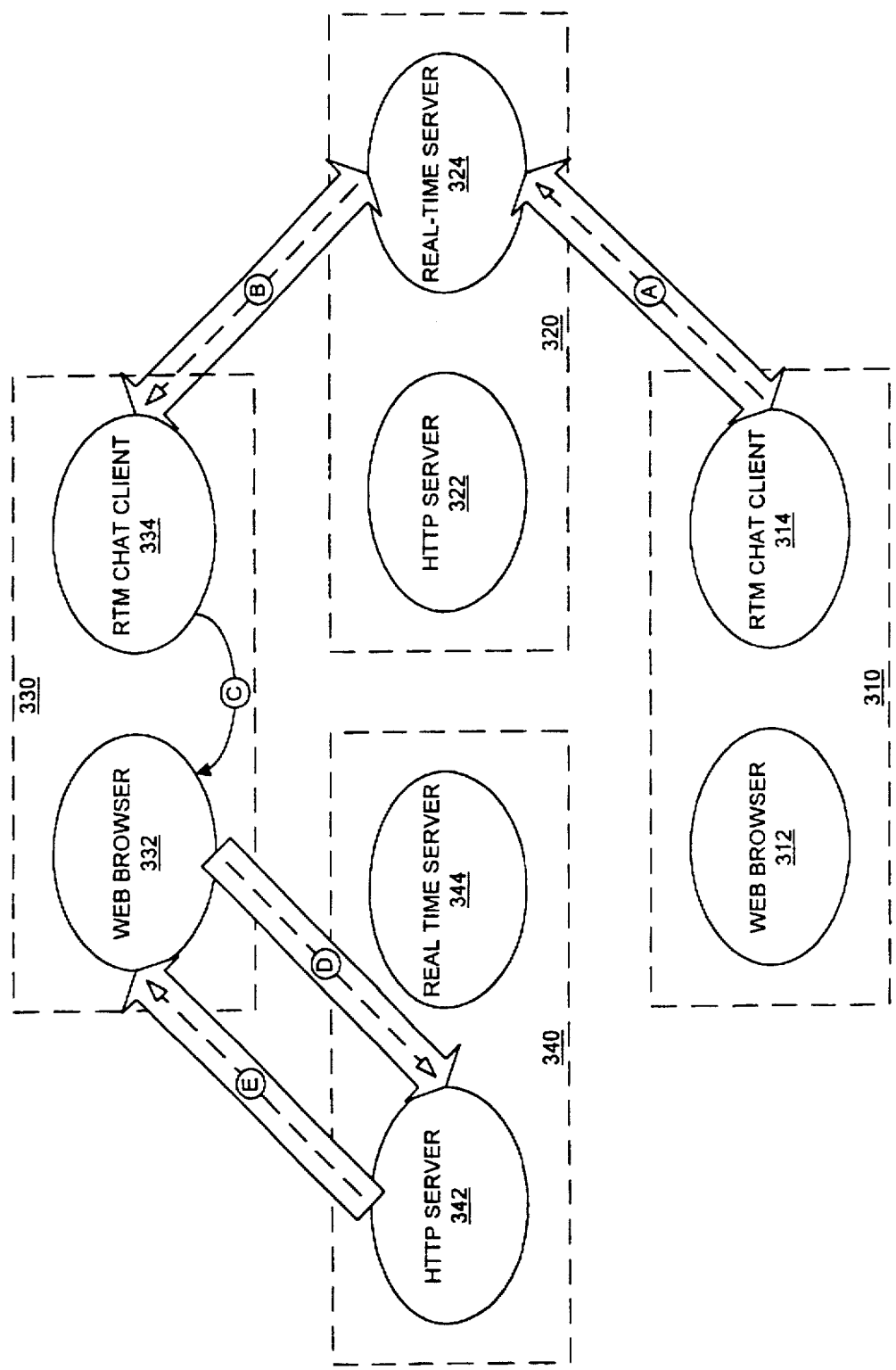
FIG. 3 is a schematic diagram of how a hyperlink functions during a real time network chat, in accordance with the present invention.

The manner in which hyperlinks function in a chat session among RTM chat clients is shown in more detail in FIG. 3. The two way arrow between RTM chat client 314 in client 310 and a real time server 324 in host 320 represents a bi-directional TCP/IP-real time protocol communications channel. The two way arrow between RTM chat client 334 in client 330 and the real time server 324 in host 320 also represents another bi-directional TCP/IP-real time protocol communications channel. The one way arrows between web browser 332 in the client 330 and HTTP server 342 in host 340 represent respective one way TCP/IP HTTP (transactional) protocol communications channels. The host 310 need not include a Web browser, the host 320 need not include an HTTP server 322, and the host 340 need not include a real time server 340.

RTM chat client 314 (e.g. Sarah) creates a message that includes an embedded hyperlink, and sends that message through the real time server 324 (action "A") to the RTM chat client 334 (e.g Sam) (action "B"). Note that other actions that may be occurring, such as echo of the message back to the RTM chat client 3 14 and communication of the message to other joined chat clients, are omitted for clarity. The client 330 (e.g Sam) then causes his Web browser 332 to access the URL associated with the hyperlink embedded in the chat message (e.g. ichat site) (action "C"). Action "C" is performed in any suitable manner. For example, if the Web browser 332 is inactive, the RTM chat client 334 simply launches the Web browser 332 using the URL associated with the hyperlink as a command line argument. If the Web browser 332 happens to be running, the RTM chat client 334 communicates the page request to the Web browser 332 using any suitable interface protocol such as the DDE protocol, which is standard in such operating systems as the Microsoft® Windows® Version 3.1 operating system and the Microsoft® Windows® 95 operating system. Newer protocols and methods suitable for having the RTM chat client 334 cause the Web browser 332 to acquire a Web page include plug-in technologies, ActiveX technologies, and Java technologies. The Web browser 332 makes a TCP/IP connection with the HTTP server 342 (or any other HTTP server, including HTTP server 322) and Web browser 332 makes a request for a Web page (action "D") by sending the URL associated with the embedded hyperlink. The HTTP server 342 responds by delivering the requested Web page (action "E"), and the TCP/IP connection between the Web Browser 332 and the HTTP server 342 is terminated. Meanwhile, the bi-directional TCP/IP-real time protocol communications channels between the RTM chat client 314 and the real time server 324, and between the RTM chat client 334 and the real time server 324 remain open if desired to continue the chat session.

The description of the invention set forth herein is illustrative, and does not limit the scope of the invention as set forth in the following claims. Variations and modifications of the embodiments disclosed herein are possible. For example, various real time communications protocols and various markup languages may be used. These and other variations and modifications of the embodiments disclosed herein may be made without departing from the spirit of the invention and from the scope of the invention as set forth in the following claims.

What is claimed is:

1. A method for real time communication over a computer network comprising:
launching a real time chat server;
launching first and second real time chat clients;
establishing real time communications protocol connections over respective network communications connections between the first real time chat client and the chat server and between the second real time chat client and the chat server;
embedding a hyperlink instruction in a message using the first real time chat client; and
sending the message via the real time communications protocol connections from the first real time chat client to the second real time chat client via the chat server.

2. A method as in claim 1 further comprising embedding a markup language instruction in the message.

3. A method as in claim 1 wherein the real time communications connections are TCP/IP connections.

4. A method as in claim 1 further comprising:
receiving the message on the second real time chat client from the chat server via the real time communications protocol connections;
parsing the message to identify the hyperlink instruction contained therein; and
displaying the message on at least one of the first and second real time chat clients in accordance with the hyperlink instruction contained therein.

5. A method as in claim 4 wherein the hyperlink instruction is associated with a document address, further comprising passing the document address from at least one of the first and second real time chat clients to a document acquisition means.

* * * * *